(12) United States Patent
Bartlett et al.

(10) Patent No.: US 12,046,099 B2
(45) Date of Patent: Jul. 23, 2024

(54) METHOD AND APPARATUS FOR FUEL PAYMENT PROCESSING

(71) Applicant: FORD GLOBAL TECHNOLOGIES, LLC, Dearborn, MI (US)

(72) Inventors: Alexander Bartlett, Wyandotte, MI (US); Dylan Erb, Allen Park, MI (US); Jacob Wiles, Plymouth, MI (US); Bikram Singh, Royal Oak, MI (US); Baocheng Sun, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 412 days.

(21) Appl. No.: 17/188,566

(22) Filed: Mar. 1, 2021

(65) Prior Publication Data
US 2021/0183197 A1    Jun. 17, 2021

Related U.S. Application Data

(62) Division of application No. 15/870,482, filed on Jan. 12, 2018, now Pat. No. 10,957,146.

(51) Int. Cl.
*G06Q 50/06* (2024.01)
*G06Q 20/32* (2012.01)
*G07F 15/00* (2006.01)
*H04W 4/44* (2018.01)

(52) U.S. Cl.
CPC ....... *G07F 15/005* (2013.01); *G06Q 20/3278* (2013.01); *G06Q 50/06* (2013.01); *H04W 4/44* (2018.02)

(58) Field of Classification Search
CPC ........ Y02T 90/12; G06Q 50/06; G06Q 50/30; G07F 15/005; H04W 4/44
See application file for complete search history.

(56) References Cited

U.S. PATENT DOCUMENTS 8,224,370 B2    7/2012  Miucic
8,604,937 B2   12/2013  Owens et al.
(Continued)

FOREIGN PATENT DOCUMENTS

JP    2010158135 A  *  7/2010

OTHER PUBLICATIONS

Skydel, Seth. "Short Range—Long Value; RFID: Radio Frequency Identification—Technology Applications Offer Benefits to Transportation and Mobile Workforce Operations." Transport Technology Today (2002): 10(8). ProQuest. Web. Mar. 29, 2024. (Year: 2002).*

(Continued)

*Primary Examiner* — Michael P Harrington
(74) *Attorney, Agent, or Firm* — Joseph Zane; Brooks Kushman P.C.

(57) ABSTRACT

A system includes a processor configured to receive a vehicle identifier identifying a vehicle from a first digital entity. The processor is also configured to digitally obtain a payment account associated with the identifier, responsive to receiving the identifier. The processor is further configured to validate payment rights through input from a second entity, confirming the right to use the account to pay for charging the vehicle and responsive to successful validation, charge the payment account for vehicle charging, following vehicle charging completion.

12 Claims, 6 Drawing Sheets

(56) References Cited

U.S. PATENT DOCUMENTS

| | | | |
|---|---|---|---|
| 2010/0161469 A1* | 6/2010 | Littrell | B60L 53/68 |
| | | | 705/35 |
| 2010/0274570 A1 | 10/2010 | Proefke et al. | |
| 2013/0110296 A1 | 5/2013 | Khoo et al. | |
| 2013/0254097 A1* | 9/2013 | Marathe | G07F 15/005 |
| | | | 705/35 |
| 2013/0293349 A1 | 11/2013 | Templ et al. | |
| 2014/0085110 A1 | 3/2014 | Scofield et al. | |
| 2014/0159857 A1 | 6/2014 | Teda et al. | |
| 2014/0191718 A1* | 7/2014 | Reineccius | B60L 53/65 |
| | | | 320/108 |
| 2015/0055564 A1 | 2/2015 | Alam et al. | |
| 2017/0313205 A1 | 11/2017 | Tseng et al. | |
| 2019/0106317 A1 | 4/2019 | Sahota et al. | |
| 2019/0248250 A1* | 8/2019 | Lyutskanov | B60L 53/18 |
| 2019/0295189 A1* | 9/2019 | Strasser | G06Q 20/322 |

OTHER PUBLICATIONS

Ritrovati, Gianluca, et al. "Active role of a NFC enabled smartphone in EV-EVSE charging process." 2014 IEEE International Electric Vehicle Conference (IEVC). IEEE, 2014.

* cited by examiner

METHOD AND APPARATUS FOR FUEL PAYMENT PROCESSING

CROSS-REFERENCE TO RELATED APPLICATIONS

This application is a division of U.S. application Ser. No. 15/870,482 filed Jan. 12, 2018, now U.S. Pat. No. 10,957,146, issued Mar. 23, 2021, the disclosure of which is hereby incorporated in its entirety by reference herein.

TECHNICAL FIELD

The illustrative embodiments generally relate to methods and apparatuses for fuel payment processing.

BACKGROUND

Public charging stations for plug-in electrified vehicles can vary significantly in their operation, user interface, and payment method. Charging stations may have different manufacturers, and may be operated by different charge providers, each with a unique procedure for plugging in the charge cord, establishing payment, initiating the charge, and informing the user of the charge progress.

In order to initiate a charge at a paid public charge station, some form of identification and payment are typically required. Usually, the payment and initiation are done in one of four ways: tapping an RFID card that is linked to a credit card, activating the charge through a phone application (after selecting the appropriate charger on the app), inserting a credit card directly, or calling a phone number listed on the charger. These methods vary from charger to charger and often require the user to carry several different RFID cards and/or apps on their phone. All of this variability creates complexity and confusion for customers, who are accustomed to the highly standardized and convenient re-fueling process that exists at gas/diesel stations.

SUMMARY

In a first illustrative embodiment, a system includes a processor configured to receive a vehicle identifier identifying a vehicle from a first digital entity. The processor is also configured to digitally obtain a payment account associated with the identifier, responsive to receiving the identifier. The processor is further configured to validate payment rights through input from a second entity, confirming the right to use the account to pay for charging the vehicle and responsive to successful validation, charge the payment account for vehicle charging, following vehicle charging completion.

In a second illustrative embodiment, a computer implemented method includes receiving a vehicle identifier, responsive to connecting a charging cable to a vehicle, over a connection established through the charging cable. The method also includes requesting payment information from a cloud account, the information associated with the vehicle identifier transmitted to the cloud account. The method further includes beginning charging of the vehicle responsive to receiving the payment information and using the payment information to pay for the charging, subsequent to charge completion.

In a third illustrative embodiment, a computer implemented method includes receiving a vehicle identifier wirelessly from a vehicle fob, at a vehicle charger. The method also includes digitally requesting payment information associated with the vehicle identifier, the request including the vehicle identifier. The method further includes verifying permission to use the payment information by querying an entity other than the vehicle fob, wherein the entity verifies the payment by responding with a predefined verification. Also, the method includes beginning charging of the vehicle responsive to verifying the payment information and using the payment information to pay for the charging, subsequent to charge completion.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
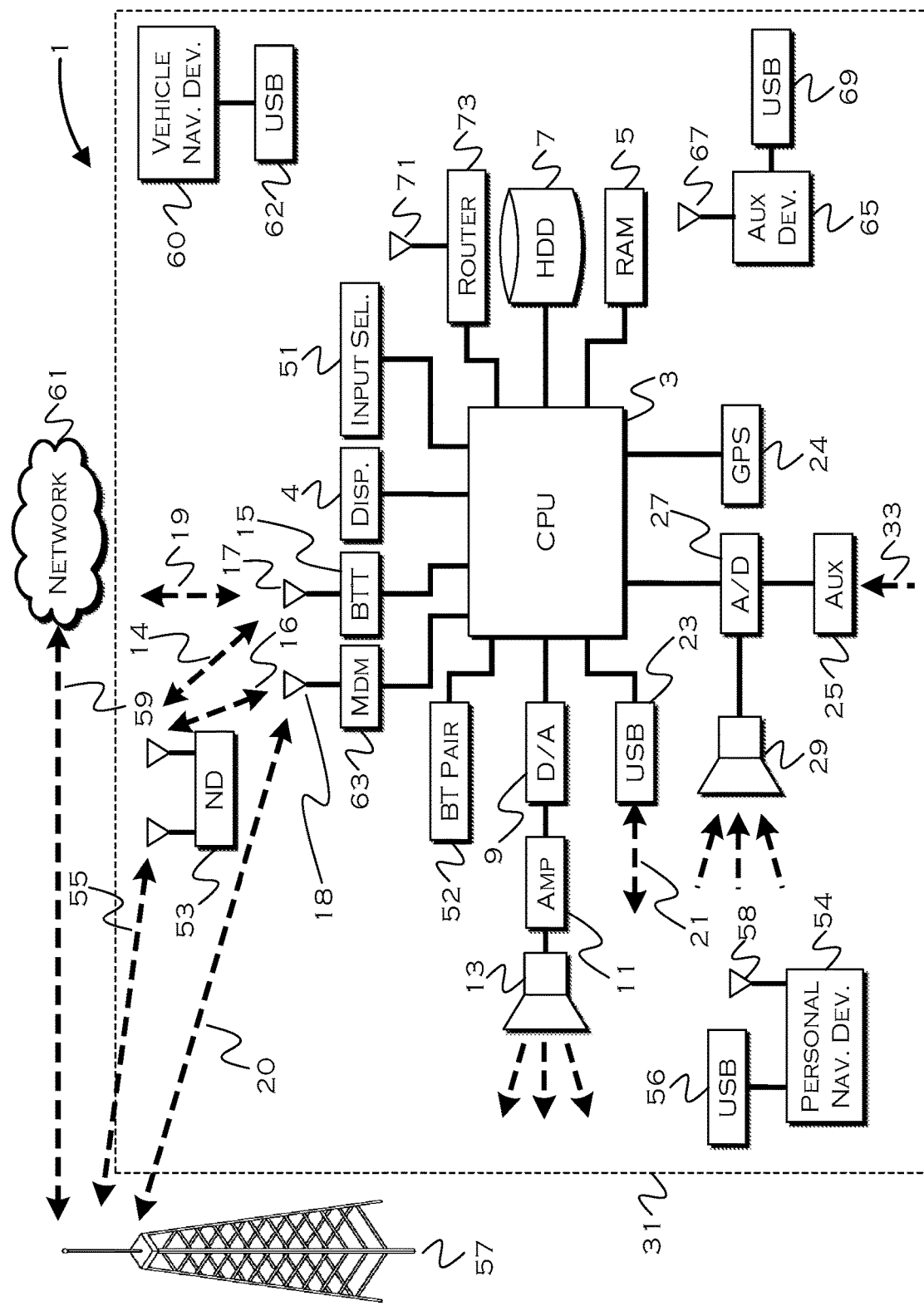
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Because of user expectations and preferences for simplicity in user payment solutions, there is an opportunity to provide a standardized, simplified, user-friendly method for public charging.

The illustrative embodiments provide an ease of use in charging, similar to the ease that keyless entry and push-button start brings to the vehicle itself. Each proposed charging station can detect the vehicle VIN, link to associated user payment information, authenticate and then initiate a charge automatically when plugged in. Detection of a VIN can be done via the vehicle can bus once a charge cord is plugged in, by wirelessly interfacing with the vehicle key fob, or both (for additional security).

User payment information may be associated with a VIN and can be stored in the cloud, or offline in the vehicle itself. Initiation of a payment and charge start could be done via a single button press on the charger, a button press on a smart phone app, a button press on the vehicle display, or could be completely automatic based on prior authorization, for example.

This proposed charging process can greatly minimize the user interaction with the charging station, avoid credit card or RFID card swiping or scanning, and provide a standardized experience that could be implemented across any charger manufacturer or provider.

Figure 2:
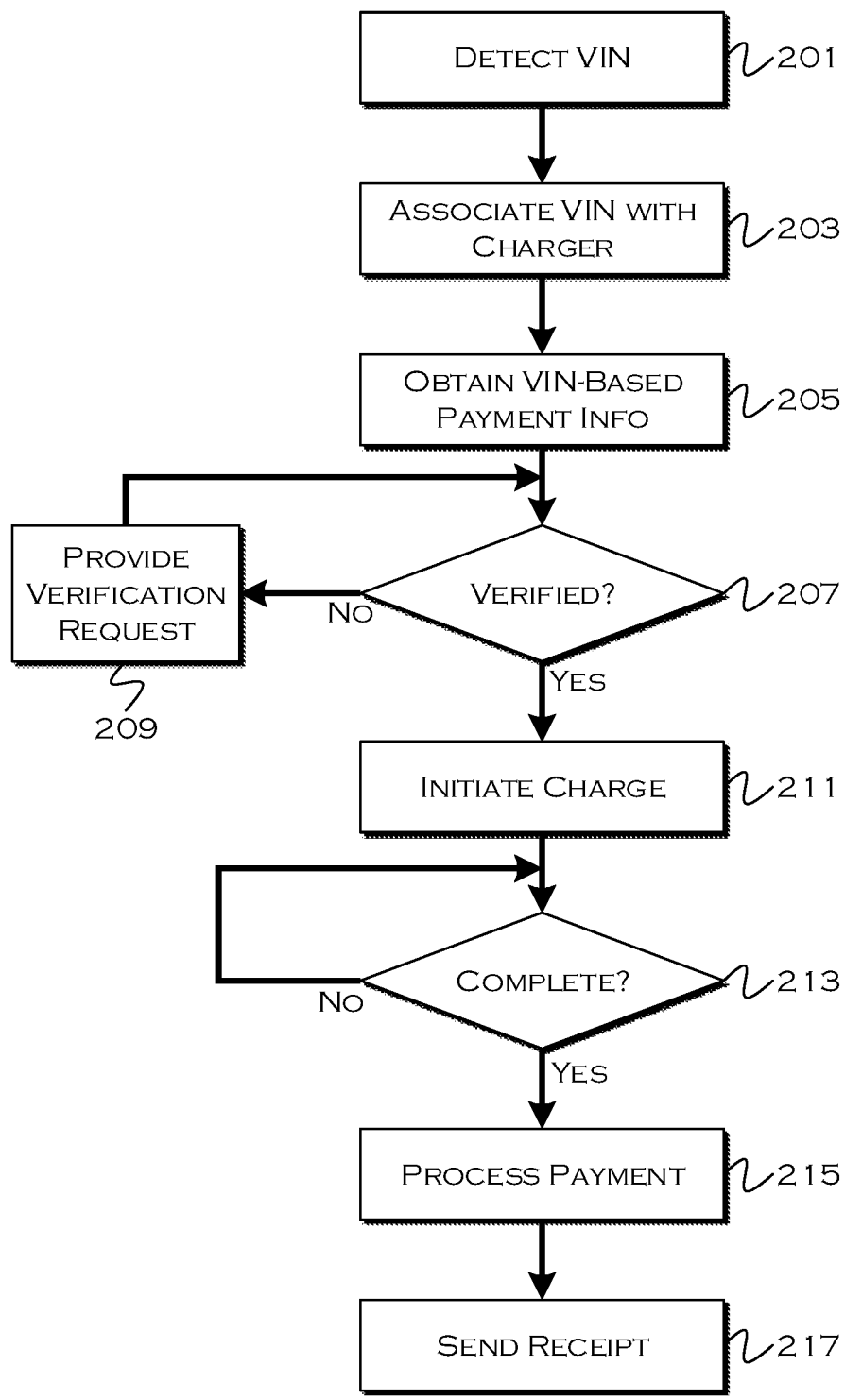
FIG. 2 shows an illustrative process for payment detection and processing.

FIG. 2 shows an illustrative process for payment detection and processing. In this example, the process executes on a charger or charger-affiliated computer. All of the propose solutions could be executed with respect to traditional gasoline pumps as well, assuming any detection and/or shutoff capabilities needed for an implementation were also provided as capabilities of the gasoline pump.

The process begins by detecting 201 a VIN. The VIN can be stored on a fob and detected by means of BLUETOOTH low energy, RFID, NFC or other short-range communication. Short range is preferred, because it can help avoid confusion by detecting too many IDs. Of course, signal strength and other factors could be used with longer range detection, in order to narrow choices, and/or if the customer had to confirm the particular VIN or other vehicle identifier, a longer-range solution could be used. Also, in many examples, the VIN will be verified by a second point source, different from where the VIN was received, so even if a number of VINs were initially detected, in cases where verification is used, the correct VIN from the group should be identifiable. In other models, VIN detection is facilitated by direct communication with a vehicle through a physical connection, which should remove any ambiguity in those instances.

Once the VIN has been detected, the process associates 203 that VIN with a particular charger. If multiple VINs are detected by certain detection processes, a verification step can occur before association, to ensure the correct VIN is associated with the correct charger. Once the VIN has been associated, the process can request 205 payment information, stored with respect to a VIN. The payment information can be stored on the cloud, or the payment information can be stored in a retrievable manner in a vehicle or fob memory.

If the VIN needs to be verified (which may depend on the method of obtaining the VIN) and if the VIN has not yet been verified 207, the process may request 209 verification of the VIN. This could include, for example, comparing the VIN to a second proximate device (e.g., fob or vehicle, whichever was not used to retrieve the VIN initially) and/or the user inputting a ZIP code, PIN, or other code into the charger. Other suitable verification methods are also contemplated.

Once the VIN has been verified, the process, now having the payment information and VIN verification, may begin 211 charging. Once the charging is complete 213, the process may submit 215 a payment request to the identified payment account. The process may also send 217 a receipt to the vehicle, to the mobile device or to another source.

An example of the above would be as follows: A user pulls up to a charging point in a vehicle, and engages the charging point in some manner (approaches, activates, etc). Additionally or alternatively, the charging point could sense the approach. The charging point may then, for example, receive a wireless communication from a fob or vehicle identifying the VIN. In another example, the VIN may not be identified until the charging cable is actually connected.

Once the VIN is obtained, the process may either verify the VIN (if there is some ambiguity or verification is otherwise required) or use the VIN to request payment information. If the VIN is to be verified, the charger could request a user PIN or ZIP code. If the VIN is verified without direct user interaction, the process could scan for a second source which can verify the VIN—for example, if the VIN came from a fob, the charger could communicate with a vehicle to ensure a vehicle having the same VIN is also present. Of course, if both the fob VIN transmission and vehicle scan were done wirelessly, this could result in a nearby fob and vehicle being assigned to the wrong charger, so it may be useful to have the secondary verification function off of either a direct (wired) connection (e.g., plugging in the charger) or a very low range and/or directional wireless signal.

The charger can also use the VIN (pre or post verification) to obtain payment information. In one example, the payment information may be cloud-based, and the charger could submit the VIN to the cloud to access a payment account. This may require some form of on-site identification, depending on how the VIN was obtained. In another example, the payment information may be stored on the vehicle or fob, and the charger could transmit the detected VIN to the second entity (vehicle or fob that did not provide the initial identification) along with a verification request and payment information request. This allows the verifying entity to also responsively provide payment information, and has the further security of requiring both the fob and vehicle to at least be present in order to process a payment.

In the above systems, the type of processing used to obtain the VIN can depend on a subsequent verification method. For example, if the user will input a PIN or zip code, and/or if the VIN will be verified via direction connection to a vehicle having the VIN, then a longer range wireless signal detection could be used to initially obtain the VIN of any vehicle in the area surrounding the charger. The charger could even receive a list of VINs, and since only one would be verified by the connection or user code, the rest could then be discarded. If the VIN is verified by other methods, which may have less assurance about false positives, the VIN obtaining may be done through a shorter range signal, to create less opportunity for confusion.

Figure 3A:
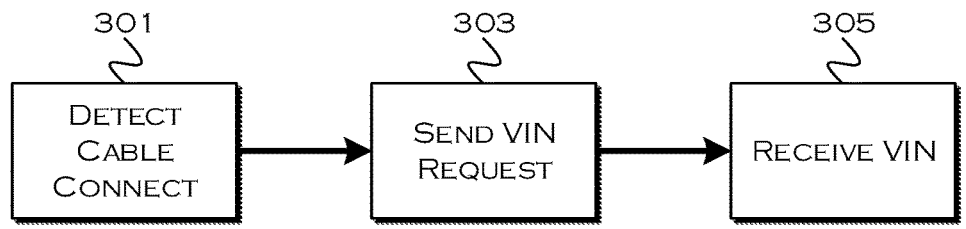
FIGS. 3A and 3B show illustrative processes for VIN detection.
Figure 3B:
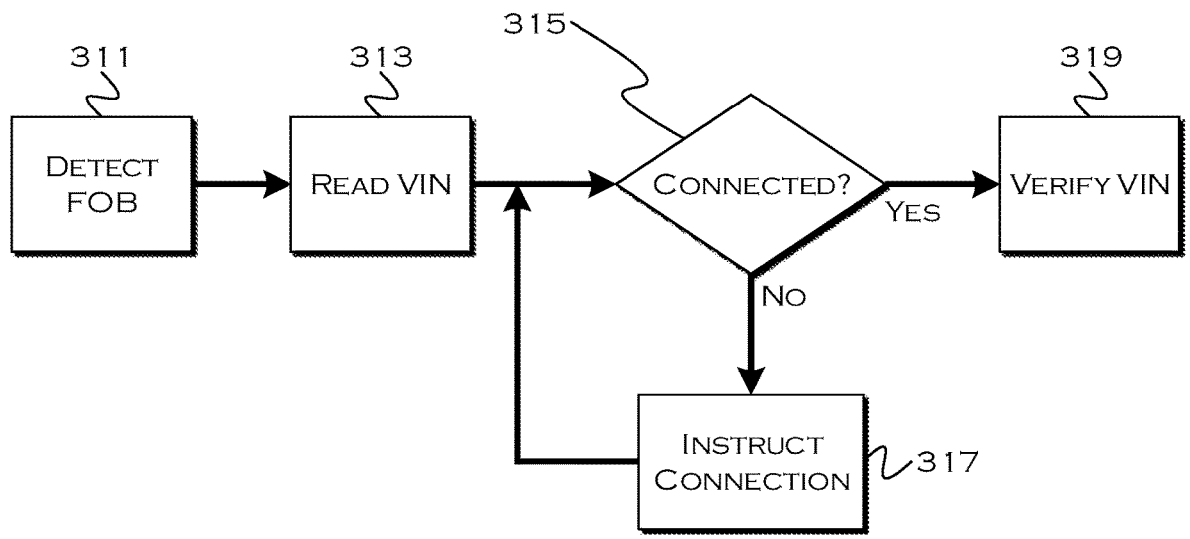

FIGS. 3A and 3B show illustrative processes for VIN detection. In the example shown in FIG. 3A, the charger obtains the VIN through direct connection. When the charger detects 301 that a charging cable has been connected to the vehicle, the charger requests 303 the VIN from a physical connection to a vehicle network. Another option would be to include a short range transceiver on the charging cable, for example, which could read, for example, and NFC or RFID signal from a transponder located in proximity to the charging point. In some reasonable manner, responsive to the cable being near or connected to the vehicle, the process receives 305 the VIN.

In FIG. 3B, the process shown detects 311 the presence of a vehicle fob, which stores a VIN in a retrievable manner. The process retrieves 313 the VIN from the fob, and, in this example, uses a direct connection with a vehicle to verify the VIN. If the charging cable is not connected 315, the process instructs the user 317 to connect the cable. Once the cable is connected, the process can use localized direct or wireless connection to verify 319 the VIN. Although it may seem like this is a similar process to 3A, by detecting the VIN from the fob, prior to connection, the process may be able to retrieve preliminary payment information and other relevant data from a user account before the user even exits the vehicle and engages the charger. This can speed up the customer experience, because as long as the direct connection verifies the VIN, the process can immediately begin charging upon connection, without having to undertake the steps of obtaining and verifying any payment information, which may be pre-obtained based on the VIN.

In a final verification process, not shown, the process could obtain the VIN from either one of the vehicle or fob, and then use a wireless communication with the other of the vehicle or fob to verify the obtained VIN. If the charger can distinguish the source for a VIN, the process could use a directional signal, a very short range signal, or a signal strength (e.g., RSSI) to determine a second verification source in a proper location for verification purposes. That is, the secondary source could be detected as approaching or being appropriately proximate through various methods, or could have to be located within a zone to be detected by a directional signal.

Figure 4:
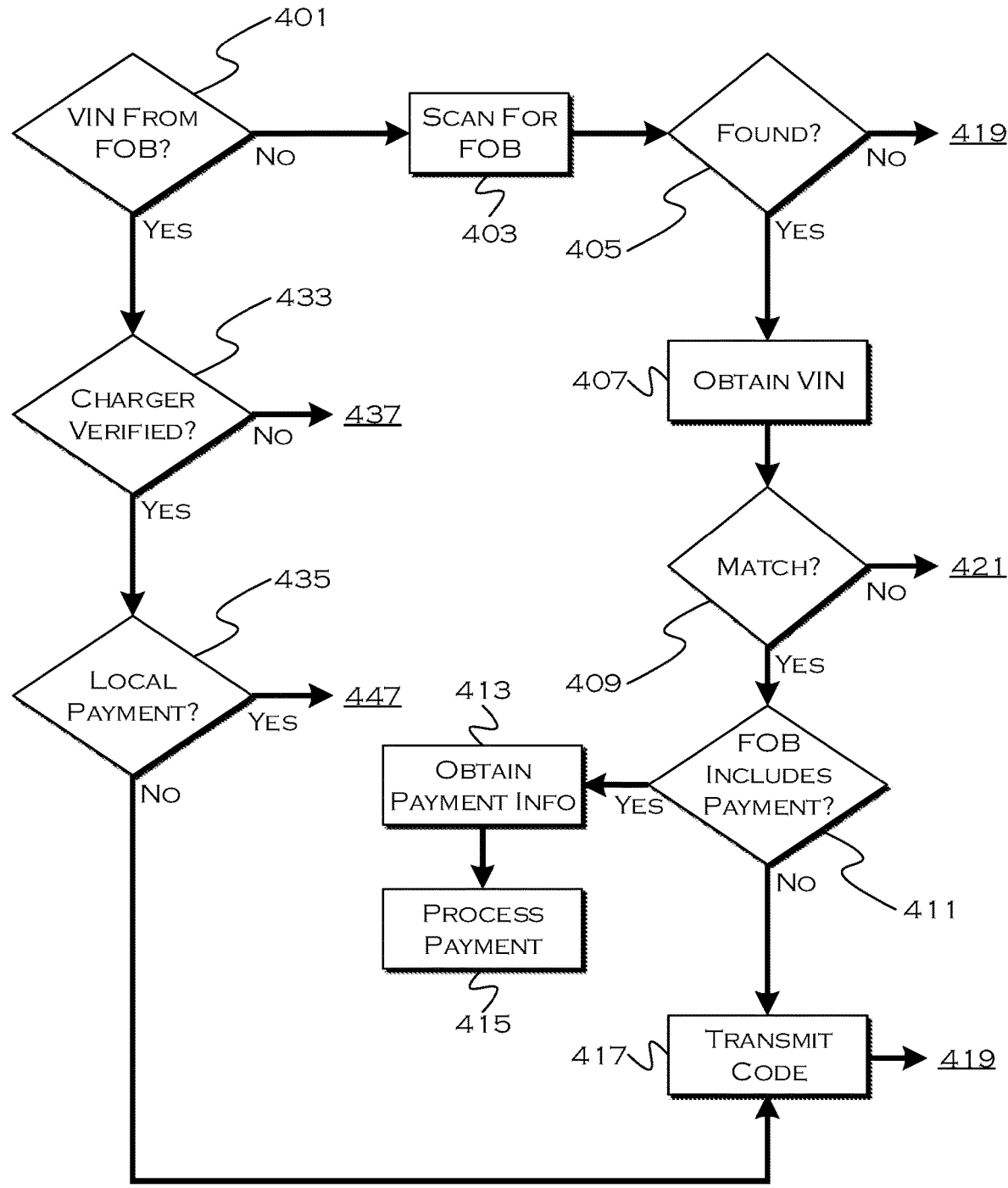
FIG. 4 shows an illustrative process for payment processing.
Figure 4:
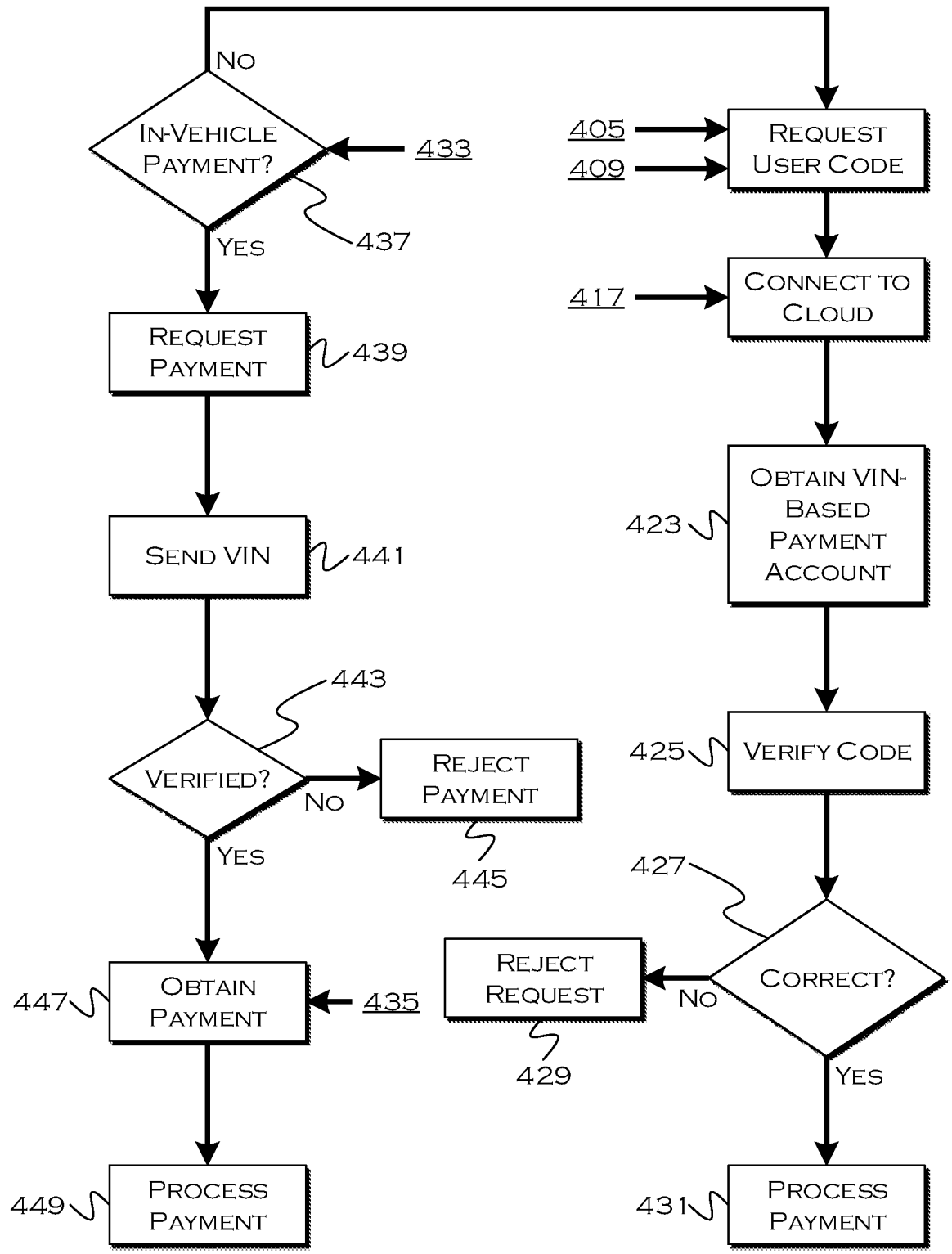

FIG. 4 shows an illustrative process for payment processing. In this example, the process will use a varied form of secondary verification depending on how the VIN was obtained initially. At any given charger, it may be the case that only one of the aspects of this solution is implemented (or something similar to one of the aspects), but the illustrative process shows a solution executable to address VINs obtained from a variety of sources in a variety of manners.

In this process, the process determines 401 if the VIN came from the fob. If the VIN did not come from the fob, then the VIN came from the vehicle (in this example), and thus the process uses the fob for verification, so the process scans 403 for a fob wireless signal. If a fob is not found 405, the process may ask 419 a user to input a PIN or zip code (or the like) for verification. The process then connects 421 to the cloud and uses the PIN plus the VIN to obtain 423 payment information. The cloud verifies 425 the code (PIN, zip, etc) and if correct 427, allows the process to process 431 a payment. If the code is wrong, the payment utilization request is rejected 429.

If the process succeeds in detecting a fob, the process requests a VIN 407 from the fob as well (for verification of the VIN which originally came from another source). If the fob VIN matches the vehicle VIN 409, the process determines 411 if the fob also includes payment information stored thereon. If so, the process obtains 413 the payment information from the fob having a VIN corresponding to the previously received VIN, and processes 415 the payment. If the fob does not have payment information, but is used to verify the VIN, the process can append 417 or transmit a verification code retrieved from the fob, or generated based on the fob confirming the VIN, usable when the charger connects to the cloud to obtain payment information. This code essentially serves as a proxy for the user input code, since the VIN has been verified by the presence of the fob.

If the VIN came from the fob originally, the process determines 433 if the charger has managed to verify the VIN (e.g., from a user verification, second source, etc). If the charger has not verified the VIN, the process determines if local vehicle-based payment retrieval is desired 437. If so, the process can request 439 payment information from the vehicle, and send 441 the unverified VIN. Since the vehicle presumably knows its own VIN, the vehicle can now verify 443 the VIN transmitted from the charger with the payment request. If the verification fails, the charger rejects 445 the request. Otherwise, the charger obtains 447 payment and can process 449 the payment. In this case the vehicle returns the payment information responsive to a correct VIN being transmitted with the request.

If the charger verifies the VIN (from the fob) through another means, such as user input code or other verification, the process determines 435 if a local payment solution is desired. If the local payment is desired, the process (having verified the VIN through the user) can directly request payment information from the fob or vehicle (perhaps using the verification code or, in another example, only requesting the payment if the VIN is pre-verified). If cloud-based payment (remote payment) is desired, the process can append a verification code, as before, and send the payment request to the cloud for processing.

Figure 5A:
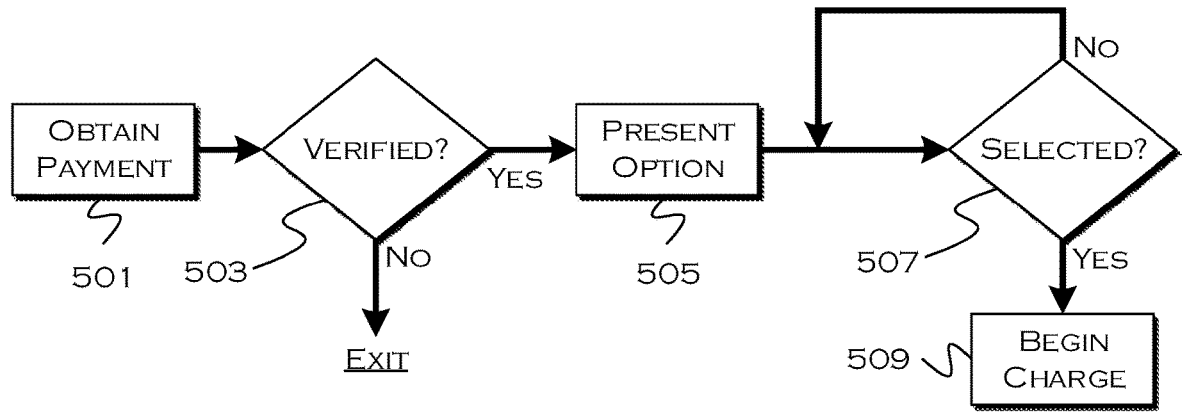
FIGS. 5A-5C show illustrative processes for charge inception.
Figure 5B:
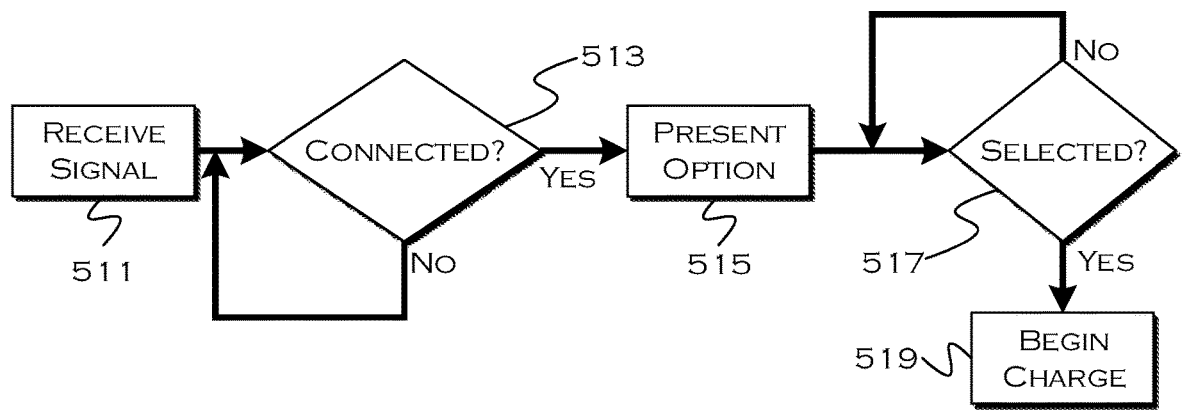
Figure 5C:
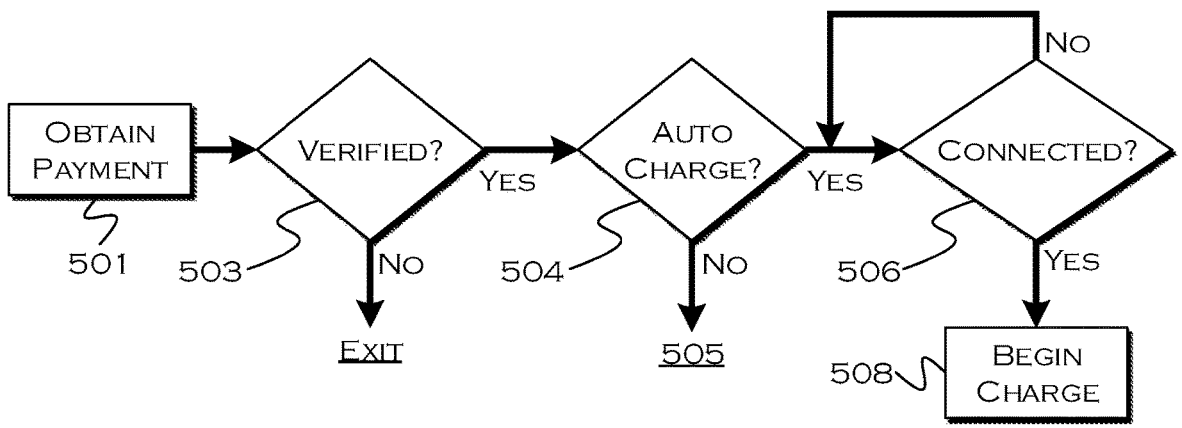

FIGS. 5A-5C show illustrative processes for charge inception. In the example shown in FIG. 5A, the process obtains 501 payment means through one of the embodiments described herein, or the like. If the payment is successfully verified 503, through one of the verification processes described herein, or the like, the process presents 505 an option to begin charging. If the user selects 507 the option, the process begins 509 charging.

In this example, the process is begun through the manual user interaction. It is also possible for the charging station to interact with a vehicle and the user could select the button to begin charging on a vehicle interface. The interaction with the vehicle could be through a wireless connection or through the physical connection established with a plugged-in charging cable.

In the second example, shown in FIG. 5B, the process is executing on a user smart phone or vehicle. In this example, the process receives 511 a wireless signal from the charging station when the charger is connected 513, which could be the case for a smartphone process or a in-vehicle process. Alternatively, the process executing on a vehicle could receive 511 a direct signal when the charger is connected 513, or the process executing on a smartphone could receive 511 a wireless signal from the vehicle when the charging cable is connected 513. The interface (of the device on which the process is executing), could present 515 a selectable option responsive to receiving the signal indicating connection. When a user presses or selects the option 517, the process can instruct 519 charging to begin. This can involve sending a signal to the vehicle, the charger, or both, from the device executing the process.

In the example shown in FIG. 5C, the process is configured for automatic charging. In that model of inception, the process obtains 501 payment information (which can be through any of the illustrative examples or the like). If the payment is verified 503, the process determines 504 if automatic charging is chosen. If automatic charging is enabled, which is a feature the user could enable when the charging options are configured, or at any other point in time, the process can automatically determine 506 that a charger is connected and responsively begin charging 508.

Through use of the illustrative embodiments, users can conveniently configured and store charging payment options in a manner usable with a variety of charging configurations. Then, depending on the model implemented, the user can have payment information obtained and verified and easily begin and pay for charging when approaching a variety of charging points, without having to determine a particular solution enabled for the given charging point.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A computer implemented method comprising:
   receiving a vehicle identifier for a vehicle, responsive to connecting a charging cable to a vehicle, over a connection established through the charging cable;
   requesting payment information from a cloud account, the information associated with the vehicle identifier transmitted to the cloud account;
   detecting a wireless fob signal of a fob for the vehicle;
   wirelessly receiving a vehicle identifier from the fob;
   validating payment rights confirming a right to use a payment account associated with the vehicle identifier, by confirming that the vehicle identifier from the fob matches the vehicle identifier received over the connection established through the charging cable;
   responsive to validating the payment rights, beginning charging of the vehicle; and
   using the payment information to pay for the charging, subsequent to charge completion.

2. The method of claim 1, wherein the connection established through the charging cable is a wired direct connection to the vehicle.

3. The method of claim 1, wherein the connection established through the charging cable is established through an NFC receiver included in the charging cable, configured to receive short-range wireless NFC information including a vehicle identifier when the charging cable is connected to the vehicle.

4. The method of claim 1, wherein the connection established through the charging cable is established through an RFID reader included in the charging cable, configured to receive short-range wireless RFID information including a vehicle identifier when the charging cable is connected to the vehicle.

5. A non-transitory storage medium storing instructions that, when executed by a processor associated with a charging station, cause the processor to perform a method comprising:
   receiving a vehicle identifier for a vehicle, responsive to connecting a charging cable to a vehicle, over a connection established through the charging cable;
   requesting payment information from a cloud account, the information associated with the vehicle identifier transmitted to the cloud account;
   detecting a wireless fob signal of a fob for the vehicle;
   wirelessly receiving a vehicle identifier from the fob;
   validating payment rights confirming a right to use a payment account associated with the vehicle identifier, by confirming that the vehicle identifier from the fob matches the vehicle identifier received over the connection established through the charging cable;
   responsive to validating the payment rights, beginning charging of the vehicle; and
   using the payment information to pay for the charging, subsequent to charge completion.

6. The storage medium of claim 5, wherein the connection established through the charging cable is a wired direct connection to the vehicle.

7. The storage medium of claim 5, wherein the connection established through the charging cable is established through an NFC receiver included in the charging cable, configured to receive short-range wireless NFC information including a vehicle identifier when the charging cable is connected to the vehicle.

8. The storage medium of claim 5, wherein the connection established through the charging cable is established through an RFID reader included in the charging cable, configured to receive short-range wireless RFID information including a vehicle identifier when the charging cable is connected to the vehicle.

9. A charging system comprising:
   a charging cable; and
   at least one processor enabled to:
   receive a vehicle identifier for a vehicle, responsive to connecting the charging cable to a vehicle, over a connection established through the charging cable;
   request payment information from a cloud account, the information associated with the vehicle identifier transmitted to the cloud account;
   detect a wireless fob signal of a fob for the vehicle;
   wirelessly receive a vehicle identifier from the fob;
   validate payment rights confirming a right to use a payment account associated with the vehicle identifier, by confirming that the vehicle identifier from the fob matches the vehicle identifier received over the connection established through the charging cable;
   responsive to validating the payment rights, begin charging of the; and
   use the payment information to pay for the charging, subsequent to charge completion.

10. The system of claim 9, wherein the connection established through the charging cable is a wired direct connection to the vehicle.

11. The system of claim 9, wherein the connection established through the charging cable is established through an NFC receiver included in the charging cable, configured to receive short-range wireless NFC information including a vehicle identifier when the charging cable is connected to the vehicle.

12. The system of claim 9, wherein the connection established through the charging cable is established through an RFID reader included in the charging cable, configured to receive short-range wireless RFID information including a vehicle identifier when the charging cable is connected to the vehicle.

* * * * *